March 30, 1937.  D. E. GRAY  2,075,435

APPARATUS FOR MAKING GLASS BUILDING BLOCKS

Filed May 21, 1934

INVENTOR.
DAVID E. GRAY
BY Lloney & Cole
ATTORNEYS.

Patented Mar. 30, 1937

2,075,435

UNITED STATES PATENT OFFICE 2,075,435

APPARATUS FOR MAKING GLASS BUILDING BLOCKS

David E. Gray, Corning, N. Y., assignor to Corning Glass Works, Corning, N. Y., a corporation of New York Application May 21, 1934, Serial No. 726,833

4 Claims. (Cl. 18—17)

This invention relates to glass, and more particularly to a method of producing with great accuracy a plurality of glass articles of definite uniform dimensions.

Prior structures which are composed of glass building units, such as blocks, bricks, tiles, etc., do not appear monolithic and the transparent or translucent character of such structures is marred by the unsightly appearance of thick seams of cement or adhesive. It would, therefore, be desirable to assemble such units with a minimum of cement or adhesive in order to take full advantage of the qualities which make glass suitable for this purpose. In order to reduce the thickness of the seams to a minimum and to maintain them in a symmetrical relationship, it would further be desirable that the units have substantially constant dimensions between edges.

Heretofore great difficulty has been encountered in fabricating glass building units to meet the above requirements, because bulging invariably occurs in thick glass articles after removal from the mold due to the natural difference in cooling rate of the outer and inner portions and warping also frequently occurs during annealing. Of course such articles may be finished to accurate dimensions by grinding, but this involves considerable labor and expense.

It is the object of this invention to make glass building units having constant predetermined dimensions.

Among its features my invention embodies a glass building unit having at least two opposite edges covered with a layer of synthetic resin to level off the unintentional surface irregularities thereof, the outer surface of the layers of resin being a predetermined distance apart.

My invention further resides in the novel construction, combination and arrangement of parts to be more fully described herein, claimed in the appended claims, and illustrated in the accompanying drawing in which Fig. 1 is a plan view of an apparatus for applying parallel facings of synthetic resin to the opposite faces of glass blocks or building units;

Figure 1:
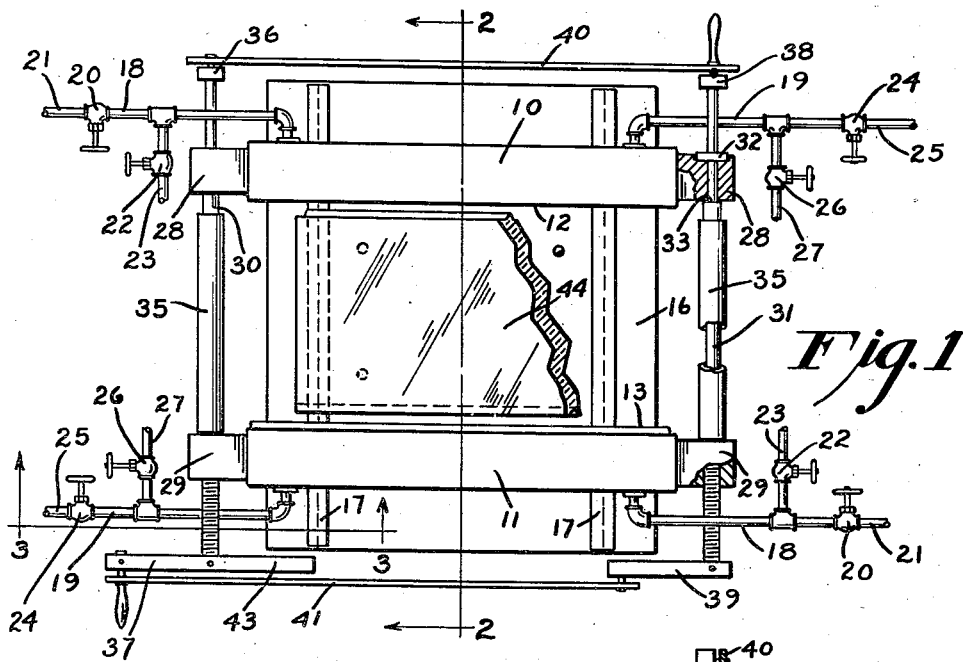
Figure 2:
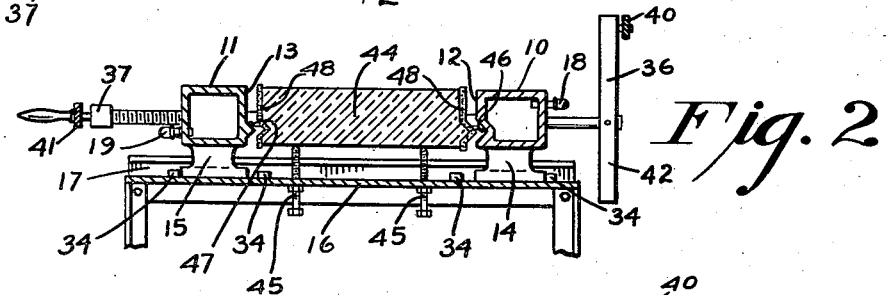
Fig. 2 is a vertical section on the line 2—2 of Fig. 1.
Figure 3:
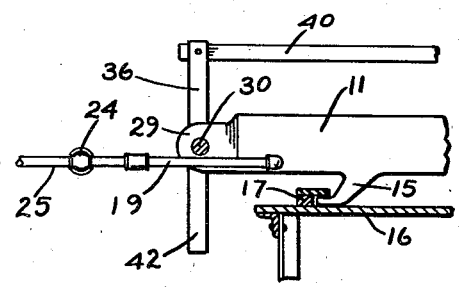
Fig. 3 is a fragmentary vertical section on the line 3—3 of Fig. 1.
Figure 4:
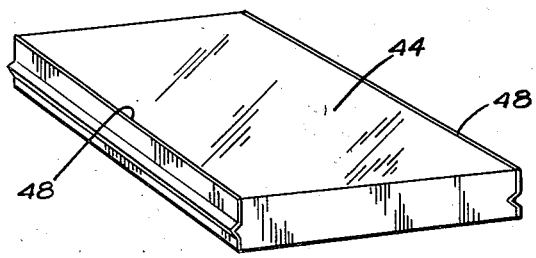
Fig. 4 is a perspective view of a glass block or building unit having opposite parallel facings of synthetic resin in accordance with my invention.

In Figs. 1, 2 and 3, a pair of platens 10 and 11, having polished inner faces 12 and 13, are supported by feet 14 and 15 which rest upon a table 16 and are slidably engaged by a pair of tracks 17 which are bolted to the table. The platens 10 and 11 are hollow and each is provided with an upper tubular conduit 18 and a lower tubular conduit 19 attached to the outer face of the opposite ends of the respective platen and communicating with its hollow interior. The conduits 18 are each provided with a valve 20 which communicates with a steam line 21, and a valve 22, which communicates with a waste line 23. The conduits 19 are each provided with a valve 24, which communicates with a water line 25, and a valve 26, which communicates with a waste line 27. The platens 10 and 11 are also provided at their ends with bosses 28 and 29 respectively, which serve as bearings for shafts 30 and 31 which pass therethrough. Collars 32, only one of which is shown, are pinned on one end of each of the shafts 30 and 31 and serve as stops against the recessed outer faces of the bosses 28. The remaining portions of the shafts 30 and 31 are larger in diameter than the portions which are within the bosses 28 and form shoulders as at 33 which bear against the inner faces of the bosses 28. The shafts 30 and 31 are threaded where they pass through the bosses 29, and the bosses 29 are internally threaded to correspond therewith. The shafts 30 and 31 therefore are fixed longitudinally with respect to the platen 10 but, when rotated, are movable longitudinally with respect to the platen 11. Stops 34 are fixed to the top of the table 16 and limit the to-and-fro movement of the feet 14 and 15 along the tracks 17. Cylindrical sleeves 35 surround the shafts 30 and 31 and limit the movement of the platens 10 and 11 toward each other. The length of the sleeves 35 is such that, when the bosses 28 and 29 are brought against the opposite ends thereof, the feet 14 and 15 are just short of their inner limiting stops 34.

In order to move the platens 10 and 11 uniformly and with spaced relation to each other, the shafts 30 and 31 are provided with a system of cranks and connecting bars comprising cranks 36 and 37, pinned to the outer ends of the shaft 30 at an angle of 90° relative each to the other, cranks 38 and 39 pinned to the outer ends of the shaft 31 at an angle of 90° relative each to the other and two connecting bars 40 and 41, the first of which links the crank 36 to the crank 38 and the second of which links the crank 37 to the crank 39, so that all four cranks must rotate in unison. The cranks 36 and 37 are extended for a short distance beyond their centers to form counter weights 42 and 43.

For the purpose of supporting a glass building block 44 in proper relation to the platens 10 and 11, the table 16 is provided with a plurality of adjustable screws 45, two of which are shown in Fig. 2. The polished inner faces 12 and 13 of the platens may be provided with any suitable configuration, such as a groove 46 and a tongue 47, to fit a corresponding tongue and groove in the glass block 44. Sheets 48 of synthetic resin are attached to the edges of the glass block 44 by the process to be hereinafter described.

In practicing my invention, the glass building unit 44 which in the present instance comprises a block about 18 inches by 28 inches having a maximum thickness of about 3¾ inches, is placed on the screws 45, which are adjusted to level the block with respect to the platens 10 and 11 as shown in Figs. 1 and 2. It is advantageous to take the block as it comes from the lehr and while it is still somewhat warm, because this will facilitate the subsequent treatment.

Flat sheets of resin are inserted between the platens and the block. These sheets, which are shown in Fig. 2 as being attached to the block 44 and are designated 48, are in the present instance about $\frac{3}{32}$ of an inch in thickness and are somewhat larger than the faces of the glass block to which they are opposed. The cranks 36, 37, 38 and 39 are rotated to revolve the shafts 30 and 31, and move the platens 10 and 11 along the tracks 17 into abutting relation with the glass block 44, the sheets of resin being squeezed slightly between the glass block and the vertical faces 12 and 13 of the platens. The valves 20 are then opened to admit steam to the interior of the hollow platens and the valves 26 are opened to carry off any water which is formed by condensation and to insure a continuous flow of steam through the platens. The platens are thus heated and the sheets of resin are softened under the influence thereof. As the resin becomes soft, the cranks are again rotated to move the platens and compress the softened resin against the sides of the glass block 44, thereby filling out the inaccuracies in the sides of the block and forcing the resin accurately to conform to the configuration of the faces 12 and 13 of the platens. The advancing movement of the platens is continued until the bosses 28 and 29 are tightly pressed against the ends of the sleeves 35 and the excess resin is squeezed out along the edges of the block, both above and below it. The length of the sleeves 35 is such that the distance between the platens, when the sleeves are in contact with the bosses 28 and 29, is exactly equal to the desired finished dimension of the glass block.

After the sheets of resin have thus been disposed against the sides of the glass block 44, the valves 20 and 26 are closed and the valves 22 and 24 are opened to admit a flow of cold water from the lines 25 to the interiors of the platens 10 and 11, the water being allowed to escape through the waste lines 23. The platens are thus cooled and the resin is chilled and hardened after which the platens are moved away from the sides of the glass block 44 by revolving the cranks 36, 37, 38 and 39 in the reverse direction, the outermost limiting stops 34 acting to cause both platens to draw away from the resin coated sides of the glass block 44 and to prevent either one of the platens sticking thereto. As a further insurance against the platens sticking to the resin, it is advantageous to insert between each sheet of resin and its respective platen a thin sheet of Cellophane which will not stick to the platens under the conditions of the treatment and can readily be removed from the resinous faces after completion of the treatment. After the platens have been removed from the resin faced sides of the glass block 44, the projecting edges of the resin are trimmed off flush to the block with a sharp knife. The resin adheres strongly to the glass and becomes an integral part thereof.

Predetermined dimensions can thus be imparted to a plurality of glass blocks with a high degree of accuracy and a minimum of labor. In the present instance the glass blocks of the above recited dimensions were found to vary on an average by $\frac{3}{32}$ of an inch in width as they came from the lehr, but after being subjected to the above described treatment the average variation in this dimension was about .004 of an inch. For best results I have found that the thickness of the resin sheets which are employed should be about equal to the average variation in the dimension of the glass block. The faces 12 and 13 of the platens may be provided with any desired configuration to correspond with the sides of the glass block, which may be of an interlocking type as shown and described or plane with flat or curved surfaces. It will be apparent that the platens can be made to impart substantially parallel opposite edges to the block, as shown, or edges which have an angular relation to each other. Moreover, if it is desired also to treat the other two opposite edges of the glass block, this can be done with equal accuracy by turning the block through 90 degrees.

Among the various advantages to be derived from practicing my invention, the following are outstanding. My process affords a simple and economical way of truing up glass building units and units made in accordance with my invention are substantially identical with each other in regard to overall dimensions and can be assembled to form a structure with a minimum of cement or adhesive and hence can be used to form structures having a monolithic appearance. Moreover, the resin which adheres to the contacting faces of the blocks acts as a cushion when such units are assembled and walls thus formed will not be damaged by excessive vibration, which in large cities is a serious obstacle to the use of glass building units in tall buildings.

While in the foregoing there have been shown and described the preferred embodiment of my invention, it is to be understood that minor changes in the details of construction, combination and arrangement of parts may be resorted to without departing from the spirit and scope of my invention as claimed.

What I claim is:

1. An apparatus for applying facings of synthetic resin to opposite edges of glass building units, which includes a pair of movable platens, means for heating and cooling the platens, shafts connected to the platens, means for rotating the shafts to advance and retract the platens, and sleeves carried by the shafts and adapted to arrest the advance of the platens at a predetermined distance from each other.

2. An apparatus for applying facings of synthetic resin to opposite edges of glass building units, which includes a pair of movable hollow platens, means for passing heating and cooling fluid through the platens, shafts connected to the platens, means for rotating the shafts to advance and retract the platens, and sleeves carried by the shafts and adapted to arrest the advance of the platens at a predetermined distance from each other.

3. An apparatus for applying facings of synthetic resin to opposite edges of glass building units, which includes a pair of opposed movable hollow platens, a vent in each platen for introducing heating and cooling fluid into the hollow interior thereof, a vent in each platen for discharging said fluid, shafts connecting the ends of the platens, one end of each shaft being rotatably connected to one of the platens, the other end of each shaft being threaded in the other platen, means to rotate the shafts in unison at the same speed, and sleeves carried by the shafts and adapted to arrest the advance of the platens a definite distance from each other.

4. An apparatus for applying facings of synthetic resin to opposite edges of glass building units, which includes a supporting base, a pair of horizontally opposed platens slidably mounted on the base, means for heating and cooling the platens, means for advancing and retracting the platens, a plurality of vertically adjustable pegs projecting from the base between the platens, lugs mounted on the base between the platens to limit the advance of the platens, lugs mounted on the base outside of the platens to limit the retraction of the platens, and stops attached to the advancing means to arrest the advance of the platens at a definite distance from each other.

DAVID E. GRAY.